United States Patent [19]
Rosenberg

[11] 3,822,671
[45] July 9, 1974

[54] ANIMAL TOILET
[76] Inventor: Isobel K. Rosenberg, Woodslea R.D. No. 1, Landenberg, Pa. 19350
[22] Filed: June 20, 1972
[21] Appl. No.: 264,428

[52] U.S. Cl. .............................................. 119/1
[51] Int. Cl. ........................................ A01k 29/00
[58] Field of Search ........................................ 119/1

[56] References Cited
UNITED STATES PATENTS
| | | | |
|---|---|---|---|
| 2,390,854 | 12/1945 | Thompson | 119/1 |
| 2,469,784 | 5/1949 | Quinn | 119/1 |
| 3,085,550 | 4/1963 | Crawford | 119/1 |
| 3,246,630 | 4/1966 | Dearing et al. | 119/1 |

Primary Examiner—Hugh R. Chamblee
Assistant Examiner—J. N. Eskovitz
Attorney, Agent, or Firm—Connolly and Hutz

[57] ABSTRACT

Animal toilet comprises holding tank for waste material. Tank has bottom wall and side wall that extends upwardly to peripheral edge portion. Platform rests upon peripheral edge portion and covers holding tank. Platform has at least one opening therein that communicates with interior of holding tank. Partial enclosure for platform is secured to platform and holding tank and includes roof portion spaced from and directly above platform and partial side wall portion extending between platform and roof portion.

3 Claims, 6 Drawing Figures

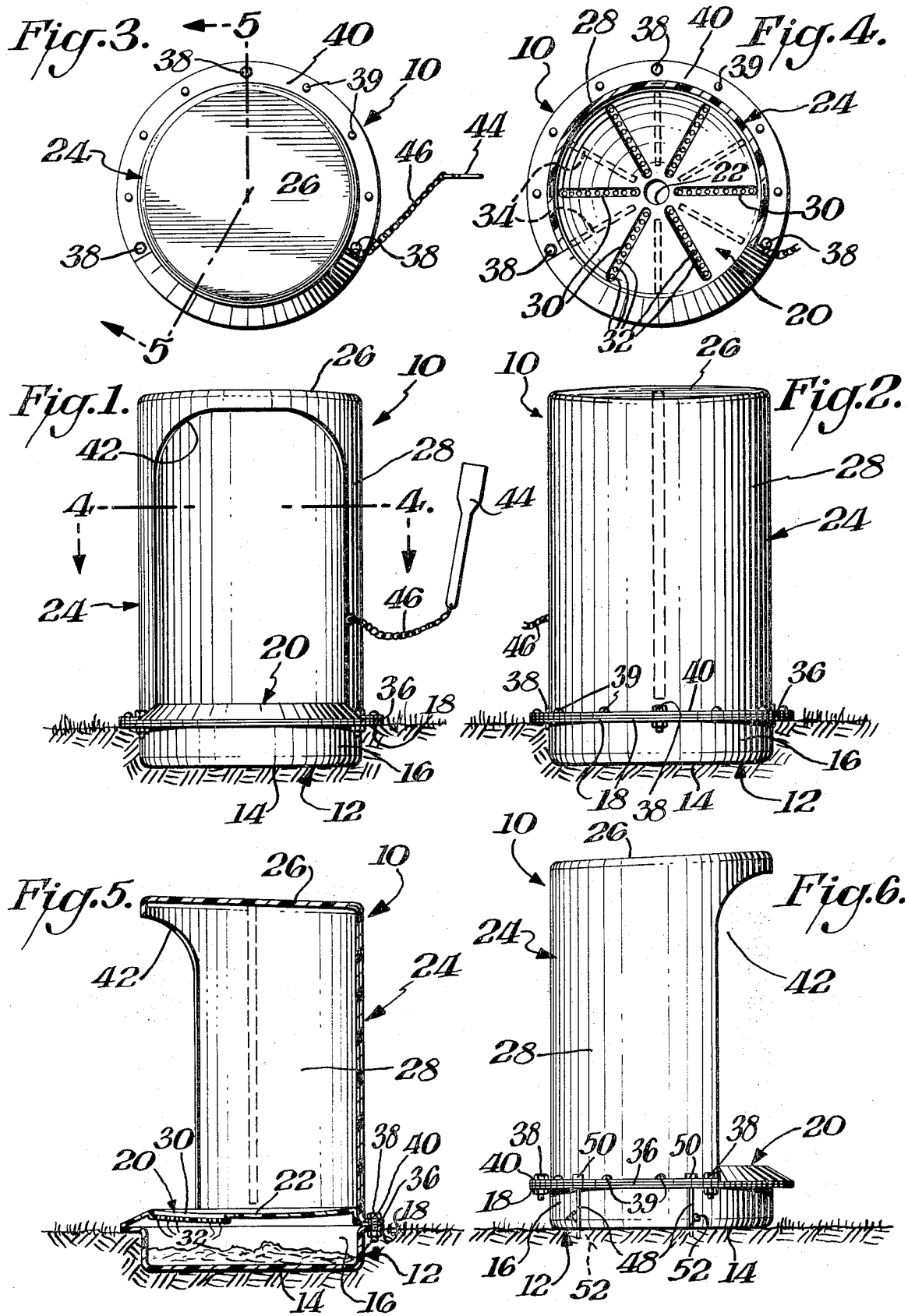

3,822,671

ANIMAL TOILET

BACKGROUND OF THE INVENTION

The present invention relates to an outside toilet for animals.

Over the years ownership of dogs, and other animals has increased significantly to the extent that disposal of animal waste presents a real and perplexing problem. Additionally, maintaining parks and other recreational areas as well as apartment complexes free of animal waste is a significant problem to those persons who maintain these areas. Prior to the present invention, numerous devices have been disclosed for disposing of animal waste materials, but for the most part, these devices involve transporting the waste material to the disposal unit. The disadvantages of such a system are obvious.

SUMMARY OF THE INVENTION

Accordingly, it is an object of the present invention to provide an animal toilet which avoids the disadvantages of the prior art and also serves to maintain open areas such as parks, and other recreational sites, apartment complexes, densely populated areas, etc., free from animal waste.

Another object of the present invention is to provide an animal toilet fabricated of relatively few and simple parts which is easy to fabricate, assemble and install.

In accordance with the present invention an animal toilet comprises a holding tank for waste material. The holding tank has a bottom wall and a side wall that extends upwardly to a peripheral edge portion. A platform rests upon the peripheral portion and covers the holding tank. The platform has at least one opening therein which communicates with the interior of the holding tank. A partial enclosure for the platform is secured to the platform and the holding tank. The partial enclosure includes a roof portion spaced from and directly above the platform and a partial side wall portion extending between the platform and the roof portion.

Preferably, the platform includes a central opening, and the platform is dish-shaped with the central opening at the lowest point of the platform. Also, a plurality of shallow and narrow channels may be provided in the platform with each of the channels radiating from the central opening in the platform. The shallow and narrow channels can include a series of spaced apart openings along the length thereof.

The peripheral edge portion of the holding tank may comprise an outwardly extending flange and the platform may include a similar flange that rests upon the flange of the holding tank. Fastening structure is provided for securing these flanges together. Moreover, the lower edge of the side wall portion of the partial enclosure may also include an outwardly directed flange secured to the flanges of the holding tank and the platform.

Continuing, the side wall portion of the partial enclosure defines an access opening for entrance onto the platform. Preferably, the roof portion of the partial enclosure slopes downwardly away from the access opening. Further, a handheld scraper element may be associated with the animal toilet, and a flexible tie is provided for securing the scraper element to the side wall portion of the partial enclosure.

BRIEF DESCRIPTION OF THE DRAWING

Novel features and advantages of the present invention in addition to those mentioned above will become apparent to those skilled in the art from a reading of the following detailed description in conjunction with the accompanying drawing wherein:

FIG. 1 is a front elevational view of an animal toilet according to the present invention;

FIG. 2 is a rear elevational view of the animal toilet of FIG. 1;

FIG. 3 is a top plan view of the animal toilet shown in FIGS. 1 and 2;

FIG. 4 is a sectional view taken alone line 4—4 of FIG. 1;

FIG. 5 is a sectional view taken alone line 5—5 of FIG. 3; and

FIG. 6 is a side elevational view of a slightly different animal toilet according to the present invention.

DETAILED DESCRIPTION OF THE INVENTION

Referring in more particularity to the drawing, an animal toilet 10 is provided as a convenience for animals such as dogs, cats and the like. The toilet 10 may be formed of fiberglass or molded of thermoplastic material by techniques which are well developed in the molding art.

Primarily, the animal toilet 10 comprises a holding tank 12 for receiving and storing animal waste material. The holding tank has a bottom wall 14 and a side wall 16 that extends upwardly to a peripheral edge portion 18. A platform 20 rests upon the peripheral edge portion 18 and covers the holding tank 12, as shown in the drawing. The platform 20 has an opening 22 that provides communication between the interior of the holding tank 12 and the area directly above the platform. A partial enclosure 24 for the platform 20 is secured to the platform and the holding tank 12, as explained more fully below. The partial enclosure 24 includes a roof portion 26 spaced from and directly above the platform 20 and a partial side wall portion 28 that extends between the platform 20 and the roof portion 26, as shown best in FIG. 1.

Referring now to FIGS. 4 and 5, the platform 20 is primarily dish-shaped so that the inside surface area slopes downwardly in an inward direction toward the central opening 22. Moreover, as shown in these Figures, a plurality of shallow and narrow channels 30 are located in the platform 20, and each of the channels radiate from the central opening 22 in the platform. The radiating shallow and narrow channels are equally spaced from one another and each includes a series of spaced apart openings or perforations 32 along the length thereof. As explained more fully below, the channels 30 with the openings 32 therein function to allow liquid waste material to drain into the holding tank 12.

The platform 20 may be reinforced by ribs 34 located between each adjacent pair of channels 30. In the case where the platform 20 is fabricated from fiberglass material, the reinforcing ribs 34 may comprise cardboard strips or other material embedded in the fiberglass.

In the embodiment of the invention shown in the drawing, the peripheral edge portion 18 of the holding tank 12 comprises an outwardly extending flange, and the platform 20 has a similar flange 36 that rests upon the flange 18 of the holding tank. Fasteners 38, such as nuts and bolts and the like, are provided for securing the flanges 18 and 36 together. As a result, the fasteners 38 function to secure the holding tank 12 and the platform 20 together as a unit. Also, the flanges 18 and 36 may include openings for receiving additional fasteners, such as rivots 39.

As shown best in FIG. 5, the lower edge of the side wall portion 28 of the partial enclosure 24 includes an outwardly directed flange 40 secured to the holding tank 12 and the platform 20 at the flanges 18 and 36 thereof. The fasteners 38 serve to connect the partial side wall 28 at its flange 40 to the holding tank and the platform. Also, the side wall portion 28 of the partial enclosure 24 defines an access opening 42 for entrance onto the platform 20. The roof portion 26 of the partial enclosure 24 slopes downwardly away from the access opening 42, for reasons explained below.

The animal toilet 10 of the present invention also includes a handheld scraper element 44 connected to the side wall portion 28 of the partial enclosure 24 by a flexible tie 46, such as a heavy vandal-proof chain. The scraper element is provided for maintaining the upper surface of the platform 20 free of waste material.

FIGS. 1-5 illustrate the preferred use of the animal toilet 10 of the present invention. Concerning this use, the toilet is installed with the holding tank 12 below grade and the flange 18 thereof located at ground level. In operation, the holding tank may be slightly filled with a bio-degradable non-caustic and anti-bacterial substance for fighting odors, such as "Fresh Away" manufactured and marketed by Satellite Industries, Inc. of Minneapolis, Minnesota. Moreover, suitable attractants may be associated with the animal toilet, for the purpose of attracting animals onto the platform 20, such as "Fire Plug", as manufactured by Fire Plug Aid Company, Pipersville, Pennsylvania.

The partial enclosure 24 functions as a shelter to shield the platform from the elements. This shelter prevents the tank from becoming filled with rain water, snow and the like which would necessarily involve more frequent emptying of the tank. Moreover, the sloping roof portion 26 directs rain water and the like away from the access opening 42.

In use, the animal is positioned upon the platform 20 and its solid and liquid waste deposits ultimately end up in the holding tank. The openings 32 in the channels 30 together with the central opening 22 function as drains for liquid waste while the central opening 22 is primarily utilized for solid waste. In this regard, the central opening 22 must be sufficiently large to accommodate the solid waste but not too large. An opening having a 2¼ inches diameter is suitable. As explained above, the scraper element 44 is used for cleaning the platform 20 of the toilet 10 by pushing the solid waste through the central opening. Moreover, the depressed channels 30 assist the animal using the toilet in obtaining a substantial footing for maneuvering upon the platform.

At periodic intervals the holding tank 12 is emptied and the toilet washed down or otherwise cleaned. The holding tank may be emptied by vacuum suction techniques wherein the contents of the tank are emptied by a suction hose connected to a vehicle mounted receptacle. Alternatively, the platform 20 and partial enclosure 24 may be disassembled from the tank 12 and the tank emptied in any suitable manner.

FIG. 6 illustrates another embodiment of the present invention wherein the animal toilet 10 is entirely positioned above grade. In this embodiment, spikes 48 are provided for securing the toilet 10 to the ground at the site of its use. Each spike 48 includes a headed portion 50 and the spikes extend through suitable openings in the flanges 18, 36, 40, as shown in the drawing. Anchors 52 are provided for anchoring the spikes 48 to the ground, as shown in FIG. 6. Otherwise, the animal toilet 10 of FIG. 6 is constructed and utilized in the same manner as the embodiment described above in connection with FIGS. 1-5.

I claim:

1. An animal toilet comprising a holding tank for waste material, the holding tank having a bottom wall and a side wall extending upwardly to a peripheral edge portion, a downwardly dished platform resting upon the peripheral edge portion and covering the holding tank, the platform having a generally central opening therein at the lowest point thereof communicating with the interior of the holding tank, a plurality of shallow and narrow channels in the platform with each of the channels radiating from the generally central opening, a series of spaced apart openings in the narrow channels, and a partial enclosure for the platform secured to the platform and the holding tank including a roof portion spaced from and directly above the platform and a partial side wall portion extending between the platform and the roof portion.

2. An animal toilet as in claim 1 wherein the side wall portion of the partial enclosure defines an access opening for entrance onto the platform, and wherein the roof portion of the partial enclosure slopes downwardly away from the access opening.

3. An animal toilet as in claim 2 including a handheld scraper element and a flexible tie securing the scraper element to the side wall portion of the partial enclosure.

* * * * *